United States Patent Office 2,998,083
Patented Aug. 29, 1961

2,998,083
SOIL TILLING DEVICE
Cornelis van der Lely and Ary van der Lely, Maasland, Netherlands, assignors to C. van der Lely N.V., Maasland, Netherlands, a limited-liability company of the Netherlands
Filed Oct. 11, 1955, Ser. No. 539,912
Claims priority, application Netherlands Nov. 3, 1954
1 Claim. (Cl. 172—527)

The invention relates to devices for tilling soil.

It is an object of the invention to provide a construction in which transverse forces are minimized. For that purpose and according to the invention there is contemplated a device employing free wheeling members having cutting blades arranged in such a fashion that said members rotate in different directions.

Figure 1:
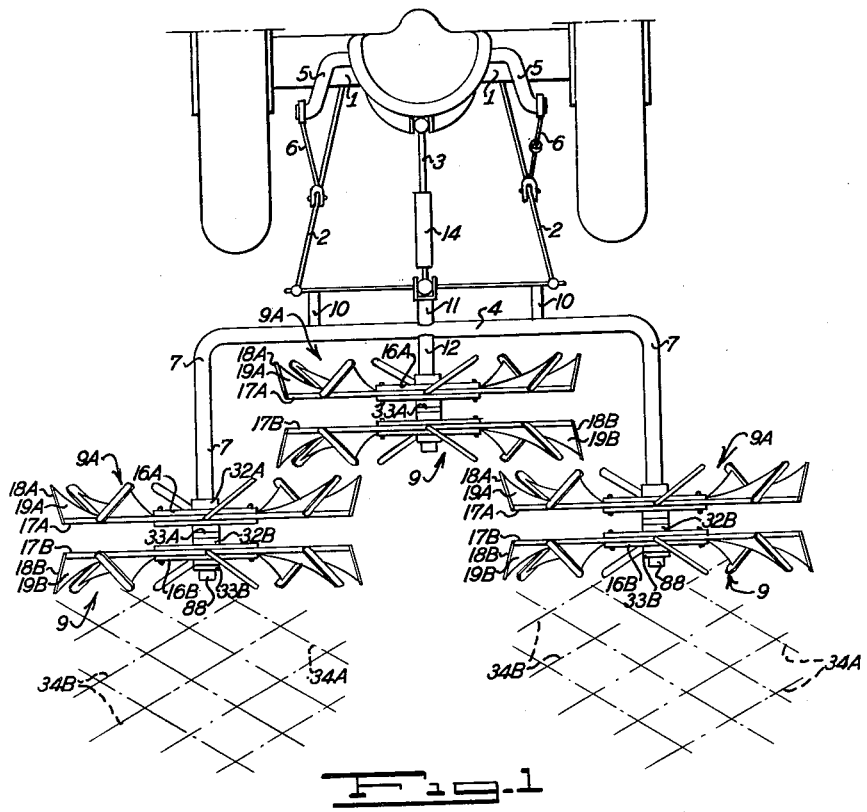
Figure 2:
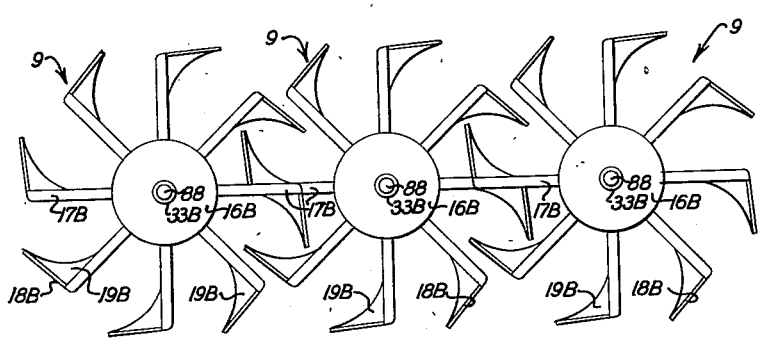

Further details will be hereinafter more fully described with reference to the accompanying drawing in which a preferred embodiment of the invention has been illustrated by way of example and in which:

FIG. 1 is a top plan view of part of a tractor on the rear side of which is mounted a device according to the invention, and FIG. 2 is a rear view of the free wheeling members.

According to FIGS. 1 and 2, the rear connecting member 1 of a tractor is provided with two arms 2 located at about the same height and an arm 3 which is located somewhat higher, a frame 4 being detachably connected to said arms. The driver of the tractor can control cranks 5 of the tractor, the crank pins of said cranks 5 being connected to the arms 2 by means of drawbars 6 so that the height of the implement above the ground can be controlled.

The extremities 7 of tube 4 are bent backwards and each carries an axle 88 for cultivator wheels 9 and 9A. Short horizontal bars 10 connect the bar 4 to the arms 2, and a bar 11 connects said bar 4 to the arm 3.

Each of the cultivator wheels consists of a hub 32A carrying two discs 16A or B, and of eight blade-shaped members. Each blade shaped member is composed of a radial bar 17A or B to which a strip 18A or B is fastened. A substantially triangular flat plate 19A or B is welded to each bar 17 and to the associated strip 18. The strips 18 are directed obliquely backwards. The bars 17 are provided with sharp ribs for cutting the soil.

Stated otherwise, the invention contemplates a device for tilling soil comprising a mobile frame 4 supporting for free rotation concentric and axial spaced wheels 9 and 9A of substantially equal diameter. The wheels are arranged transverse to the direction of travel of the device, one wheel being foremost and the other rearmost. Sets of generally triangular blades 19B are provided on the wheels and are inclined in opposite directions therefrom. These blades are, however, inclined in the same general circular direction. The blades of the foremost wheel extend forward whereas the blades on the rearmost wheel extend backwards. The blades tear open the soil indicated by dotted lines 34A and 34B.

Lateral forces are minimized as the wheels rotate in opposite directions.

What we claim is:

A device for tilling soil having a determinable direction of travel and comprising a mobile frame, two concentric and axially spaced wheels of substantially the same diameter arranged transverse to said direction of travel, one of said wheels being the foremost wheel and the other of said wheels being the rearmost wheel, means rotatably supporting said wheels on said mobile frame for free rotation about a substantially horizontal axis, and sets of generally triangular cutter blades respectively on said wheels and inclined in opposite axial directions from their respective wheels but in the same general circular direction whereby said wheels are rotated in opposite directions, the blades on the foremost wheel extending forwardly relative to said direction and the blades on the rearmost wheel extending rearwardly relative to said direction.

References Cited in the file of this patent

UNITED STATES PATENTS

| | | |
|---|---|---|
| 30,554 | Hogle | Oct. 30, 1860 |
| 732,180 | Fellows | June 30, 1903 |
| 1,076,745 | Ciccolini | Oct. 28, 1913 |
| 1,208,514 | Devendorf | Dec. 12, 1916 |
| 2,146,492 | Wiesenthal | Feb. 7, 1939 |
| 2,307,310 | Tyler et al. | Jan. 5, 1943 |
| 2,319,899 | Silver | May 25, 1943 |
| 2,341,830 | Uddenborg | Feb. 15, 1944 |
| 2,737,866 | Bowen et al. | Mar. 13, 1956 |

FOREIGN PATENTS

| | | |
|---|---|---|
| 251,383 | Germany | Oct. 2, 1912 |
| 473,676 | Germany | Mar. 20, 1929 |